US012533899B2

(12) United States Patent
Koike et al.

(10) Patent No.: US 12,533,899 B2
(45) Date of Patent: Jan. 27, 2026

(54) LIQUID EJECTION DEVICE AND CARRIAGE

(71) Applicant: SEIKO EPSON CORPORATION, Tokyo (JP)

(72) Inventors: Kaoru Koike, Matsumoto (JP); Keigo Takishima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 18/475,308

(22) Filed: Sep. 27, 2023

(65) Prior Publication Data

US 2024/0109353 A1 Apr. 4, 2024

(30) Foreign Application Priority Data

Sep. 30, 2022 (JP) ................................. 2022-158421

(51) Int. Cl.
*B41J 29/377* (2006.01)

(52) U.S. Cl.
CPC .................................. *B41J 29/377* (2013.01)

(58) Field of Classification Search
CPC ........... B41J 29/377; B41J 29/02; B41J 29/13
See application file for complete search history.

(56) References Cited

U.S. PATENT DOCUMENTS 8,657,393 B2 * 2/2014 Tsumoto ................ B41J 2/1714 347/5
2003/0016255 A1 * 1/2003 Miquel .................. B41J 19/202 347/5
2020/0130388 A1 4/2020 Saito et al.

FOREIGN PATENT DOCUMENTS

JP 2020-066157 A 4/2020

* cited by examiner

*Primary Examiner* — Justin Seo
(74) *Attorney, Agent, or Firm* — WORKMAN NYDEGGER

(57) ABSTRACT

A liquid ejection device 1 includes a head 101 for ejecting liquid, a board case 120 for housing a board unit 123 for driving the head 101, a first fan 121 fixed to the board case 120 and for sending airflow into the board case 120, a carriage 100 for housing therein the head 101 and the board case 120, and a second fan 102 for sending airflow taken from outside the carriage 100 into the carriage 100, wherein the board unit 123 is connected to the head 101 via a board-to-board connector 130, and the amount of airflow sent into the carriage 100 by the second fan 102 is larger than the amount of airflow sent into the board case 120 by the first fan 121.

8 Claims, 11 Drawing Sheets

LIQUID EJECTION DEVICE AND CARRIAGE

The present application is based on, and claims priority from JP Application Serial Number 2022-158421, filed Sep. 30, 2022, the disclosure of which is hereby incorporated by reference herein in its entirety.

BACKGROUND

1. Technical Field

The present disclosure relates to a liquid ejection device and a carriage.

2. Related Art

In the related art, a liquid ejection device is used that includes a carriage accommodating a head and a board case, in which a board unit for driving the head is accommodated. For example, JP-A-2020-66157 discloses a printing apparatus including a carriage that accommodates an ejection head and a circuit case, which accommodates a head control board for driving the ejection head.

In a liquid ejection device that includes a carriage that accommodates a head and a board case, in which a board unit for driving the head is accommodated, various electrical signals such as print data are transmitted from the board unit to the head. Therefore, in order to suppress deterioration of the quality of the signals transmitted from the board unit to the head, it is conceivable that the board unit and the head be connected to each other via a board-to-board connector. Sometimes the temperature inside the carriage rises due to input of signals to the head, so the inside of the carriage is cooled by a cooling mechanism such as a fan. For example, a printer disclosed in JP-A-2020-66157 includes an exhaust fan inside the circuit case. However, if configured so that the cooling mechanism such as a fan is provided inside the board case, and the board unit and the head are connected to each other via a board-to-board connector, the distance between the cooling mechanism and the head would be reduced and vibration of the fan or the like could reach the head, so there would be a concern that ejection accuracy of the liquid from the head is reduced.

SUMMARY

A liquid ejection device according to the present disclosure for solving the above-described problem includes a head configured to eject liquid onto a medium; a board case in which a board unit for driving the head is accommodated; a first fan fixed to the board case and configured to send airflow into the board case; a carriage that accommodates the head and the board case; and a second fan that is fixed to the carriage above the first fan and that sends airflow taken in from outside the carriage into the carriage, wherein the board unit is connected to the head via a board-to-board connector and an amount of airflow sent into the carriage by the second fan is larger than an amount of airflow sent into the board case by the first fan.

A carriage according to the present disclosure for solving the above-described problem accommodates a head configured to eject liquid onto a medium; a board case in which a board unit for driving the head is accommodated; the carriage including a first fan fixed to the board case and configured to send airflow into the board case; a carriage that accommodates the head and the board case; and a second fan that is fixed to the carriage above the first fan and that sends airflow taken in from outside the carriage into the carriage, wherein the board unit is connected to the head via a board-to-board connector and an amount of airflow sent into the carriage by the second fan is larger than an amount of airflow sent into the board case by the first fan.

DESCRIPTION OF EMBODIMENTS

Figure 1:
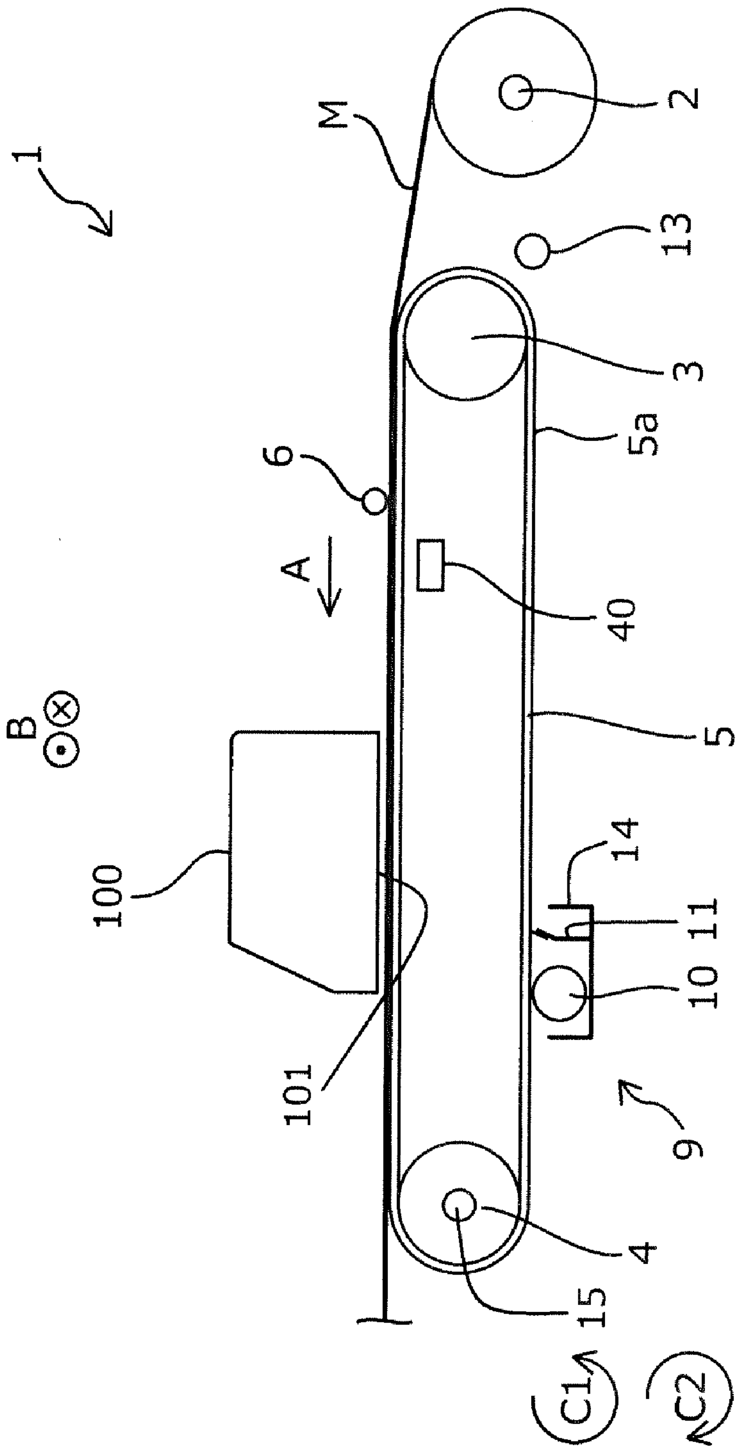
FIG. 1 is a side view of a liquid ejection device according to an embodiment of the present disclosure.

First, the present disclosure will be schematically described.

According to a first aspect of the present disclosure, there is provided a liquid ejection device including a head configured to eject liquid onto a medium; a board case in which a board unit for driving the head is accommodated; a first fan fixed to the board case and configured to send airflow into the board case; a carriage that accommodates the head and the board case; and a second fan that is fixed to the carriage above the first fan and that sends airflow taken in from outside the carriage into the carriage, wherein the board unit is connected to the head via a board-to-board connector and an amount of airflow sent into the carriage by the second fan is larger than an amount of airflow sent into the board case by the first fan.

According to this aspect, the board unit is connected to the head via the board-to-board connector. For this reason, the quality of signals transmitted from the board unit to the head is improved compared to when, for example, a flexible flat cable (FFC) is used. The amount of airflow sent into the carriage by the second fan is larger than the amount of airflow sent into the board case by the first fan. For this reason, even when the amount of airflow of the first fan is small, the second fan, which is disposed at a position above the first fan, that is, at a position separated from the head, enables suppression of any significant decrease in the cooling capacity of the board unit. That is, it is possible to adopt a configuration in which even when the air volume of the first fan, which is close to the head, is small in order to suppress vibration caused by driving the first fan, a significant decrease in the cooling capacity of the board unit can be suppressed by using the second fan. Therefore, it is possible to cool the inside of the carriage without deteriorating quality of the signals transmitted from the board unit to the head or the ejection accuracy of liquid from the head.

The liquid ejection device according to a second aspect of the present disclosure is an aspect according to the first aspect, wherein the board case is disposed above the head and the first fan is disposed above the board case and sends airflow toward the head. According to this aspect, the case is disposed above the head, and the first fan is disposed above the board case and sends airflow toward the head.

With such a configuration, by the first fan blowing air toward the head, the direction of the airflow is a direction from the board case toward the head, and the inside of the board case becomes a positive pressure. Accordingly, compared to when the direction of airflow is a direction from the head toward the board case, it is difficult for mist or the like of the liquid ejected from the head to enter inside the carriage.

The liquid ejection device according to a third aspect of the present disclosure is an aspect according to the first aspect or the second aspect, further including a cover covering at least a part of an upper section of the carriage, wherein the cover includes a top surface section positioned above the head and the top surface section includes at least one exhaust port from which airflow sent into the carriage by the second fan is discharged. According to this aspect, the top surface section includes at least one exhaust port from which the airflow sent into the carriage by the second fan is discharged.

For this reason, it is possible to suppress accumulation of heat inside the carriage by discharging the airflow from the exhaust port. Since the exhaust port is disposed in the top surface section, it is possible to suppress the airflow accompanying the exhaust from affecting the range of the liquid ejected from the head.

The liquid ejection device according to a fourth aspect of the present disclosure is an aspect according to the third aspect, wherein the at least one exhaust port is disposed in the top surface section in a region different from a region that, in plan view of the top surface section, overlaps the board case. When the exhaust port is provided in the top surface section in a region overlapping, in plan view of the top surface section, the board case, then there is a possibility that the board case becomes an obstacle and air cannot be suitably exhausted. However, according to this aspect, the at least one exhaust port is disposed in the top surface section in a region different from the region that, in plan view, overlaps the board case.

For this reason, it is possible to suppress a situation in which air cannot be suitably exhausted.

The liquid ejection device according to a fifth aspect of the present disclosure is an aspect according to the first aspect or the second aspect, further including a flow path member through which flows liquid supplied to the head from outside the carriage, wherein the flow path member is drawn into the carriage so as to be hit by the airflow sent into the carriage by the second fan. According to this aspect, the flow path member is drawn into the carriage so as to be hit by airflow sent into the carriage by the second fan.

For this reason, it is possible to cool the liquid flowing through the flow path member, and it is possible to suppress damage to the head caused by an increase in the temperature of the liquid.

The liquid ejection device according to a sixth aspect of the present disclosure is an aspect according the fifth aspect, wherein the flow path member is drawn into the carriage at a position between the second fan and the board case so as to be hit by airflow sent into the carriage by the second fan. If the flow path member were drawn into the carriage from, with respect to the board case, the side that is opposite to the side on which the second fan is disposed, there is a possibility that airflow that is at a high temperature from hitting the board case will hit the flow path member.

In contrast, according to this aspect, the flow path member is disposed at a position between the second fan and the board case. For this reason, it is possible to suppress airflow that is at a high temperature due to hitting the board case from hitting the flow path member, and to suppress an increase in temperature of the liquid flowing in the flow path member.

The liquid ejection device according to a seventh aspect of the present disclosure is an aspect according to the first aspect or the second aspect, wherein the board case includes a board case exhaust port configured to exhaust air from inside to outside the board case and the board case exhaust port faces at least one of an exhaust path which is a path of airflow sent into the carriage by the second fan inside the carriage or an airflow path connected to the exhaust path. According to this aspect, the board case exhaust port faces at least one of the exhaust path which is a path of the airflow sent into the carriage by the second fan and the airflow path connected to the exhaust path.

Therefore, the heated airflow discharged from the board case is easily sent outside the carriage along with the airflow generated by the second fan.

A carriage according to an eighth aspect of the disclosure includes a head configured to eject liquid onto a medium; a board case in which a board unit for driving the head is accommodated; the carriage including a first fan fixed to the board case and configured to send airflow into the board case; a carriage that accommodates the head and the board case; and a second fan that is fixed to the carriage above the first fan and that sends airflow taken in from outside the carriage into the carriage, wherein the board unit is connected to the head via a board-to-board connector and an amount of airflow sent into the carriage by the second fan is larger than an amount of airflow sent into the board case by the first fan. According to this aspect, the board unit is connected to the head via the board-to-board connector.

For this reason, the quality of signals transmitted from the board unit to the head is improved, for example, compared to when an FFC is used. The amount of airflow sent into the carriage by the second fan is larger than the amount of airflow sent into the board case by the first fan. For this reason, even when the amount of airflow of the first fan is small, the second fan, which is disposed at a position above the first fan, that is, at a position separated from the head, enables suppression of any significant decrease in the cooling capacity of the board unit. Therefore, it is possible to cool the inside of the carriage without deteriorating quality of the signals transmitted from the board unit to the head or the ejection accuracy of liquid from the head.

Hereinafter, embodiments of the present disclosure will be described with reference to the accompanying drawings.

First, an outline of a liquid ejection device 1 according to an embodiment of the disclosure will be described with reference to FIG. 1. As illustrated in FIG. 1, the liquid ejection device 1 according to the embodiment includes a transport device 20 capable of transporting a medium M in a transport direction A.

The transport device 20 includes a feed out section 2 capable of feeding a medium M by being set with a roll-shaped medium M and by rotating the medium M in a rotation direction C1. The transport device 20 includes a transport belt 5 capable of transporting, in the transport direction A, the medium M that was fed from the feed out section 2. The transport device 20 includes a driven roller 3 located to the upstream side in the transporting direction A, a driving roller 4 located to the downstream side in the transporting direction A, and a transport belt 5, which is an endless belt wound around the driven roller 3 and the driving roller 4.

Here, the transport belt 5 is an adhesive belt having an outer peripheral surface 5*a* on which an adhesive is applied to a medium M support surface, which is the outer surface. As shown in FIG. 1, in a state in which the medium M is attached to the outer peripheral surface 5*a*, the medium M is supported and transported by the transport belt 5. In the liquid ejection device 1 according to the embodiment, a support region of the medium M on the transport belt 5 is the upper region spanning between the driven roller 3 and the driving roller 4. The driving roller 4 is a roller rotated by driving force of the motor 15 and the driven roller 3 is a roller rotated by being driven by rotation of the transport belt 5 according to the rotation of the driving roller 4.

The liquid ejection device 1 includes a carriage 100 capable of reciprocal movement in the width direction B of the transport belt 5 and a head 101 attached to the carriage 100. The head 101 functions as a printing section capable of printing an image on the medium M transported in the transport direction A, or said differently, an ejecting section that ejects ink, which is liquid, onto the medium M. The head 101 is provided at a position facing the support region of the medium M on the transport belt 5, and can eject ink. At this time, it can be said that a support region of the medium M in the transport belt 5 is a facing region facing the head 101. The liquid ejection device 1 according to the embodiment can form an image by ejecting ink from the head 101 onto the transported medium M while reciprocating the carriage 100 in the width direction B, which intersects the transport direction A. Since the carriage 100 having such a configuration is provided, the liquid ejection device 1 of the embodiment can form a desired image on the medium M by repeating transport of the medium M in the transport direction A by a predetermined transport amount and, in a state in which the medium M is stopped, ejection of ink while moving the carriage 100 in the width direction B. Note that the internal configuration of the carriage 100 will be described in detail later.

The liquid ejection device 1 according to the embodiment includes a control section 40. The control section 40 performs overall control of each constituent member of the liquid ejection device 1 of the present embodiment.

A medium attachment section 6 is formed at a position facing the transport belt 5 at the upstream side of the carriage 100 in the transport direction A. Since the medium attachment section 6 presses the medium M against the transport belt 5 over the width direction B, the medium M is attached to the transport belt 5 in a state in which the occurrence of wrinkles or the like is suppressed.

When the medium M on which was formed an image by ejection of ink from the head 101 is discharged from the liquid ejection device 1 of the embodiment, the medium M is sent to a drying device which volatilizes a component of the ink ejected onto the medium M, a winding device which winds up the medium M on which was formed the image, or the like, which are provided in a subsequent stage of the liquid ejection device 1 of the embodiment.

Here, a print textile can be preferably used as the medium M. Print textile refers to cloth, clothes, other apparel products, and the like that are objects to be printed on. Examples of cloth include woven fabrics, knitted fabrics, and nonwoven fabrics of natural fibers such as cotton, silk, and wool, chemical fibers such as nylon, or composite fibers obtained by mixing these fibers. Clothes and other apparel include sewn T-shirts, handkerchiefs, scarves, towels, carrier bags, bags made of cloth, curtains, sheets, bedspreads, and other apparel, as well as cloth before and after cutting, which exists as parts before being sewn together.

Further, as the medium M, in addition to a print textile, it is possible to use special paper for ink jet printing such as plain paper, high-quality paper, and glossy paper. As the medium M, for example, a plastic film that was not subjected to surface treatment for ink jet printing, that is, that did not have formed thereon an ink absorbing layer, can be used, and also a medium of a base material such as paper coated with plastic or a medium to which a plastic film is adhered can be used. The plastic is not particularly limited and could be, for example, polyvinyl chloride, polyethylene terephthalate, polycarbonate, polystyrene, polyurethane, polyethylene, or polypropylene.

When a print textile is used as the medium M, since the material to be printed is likely to exhibit strike-through of the ink, which is a phenomenon in which the ink ejected onto the medium M bleeds to the rear side surface, the transport belt 5 may be contaminated with the ink. Therefore, the liquid ejection device 1 of the embodiment is provided with a cleaning section 9 for cleaning the ink that clings to the transport belt 5 due to strike-through. The cleaning section 9 of the present embodiment includes a storage section 14 in which cleaning liquid L is stored, a cleaning roller 10 that is immersed in the cleaning liquid L and that comes into contact with the transport belt 5, and a blade section 11 that wipes off the cleaning liquid L clinging to the transport belt 5. The liquid ejection device 1 of the embodiment includes a blower section 13 which can dry cleaning liquid L that was not wiped off by the blade section 11.

The liquid ejection device 1 according to the embodiment can transport the medium M in the transport direction A by rotating the driving roller 4 in the rotation direction C1. The liquid ejection device 1 can transport the medium M in a direction opposite to the transport direction A by rotating the driving roller 4 in a rotation direction C2, which is the direction opposite to the rotation direction C1.

Figure 2:
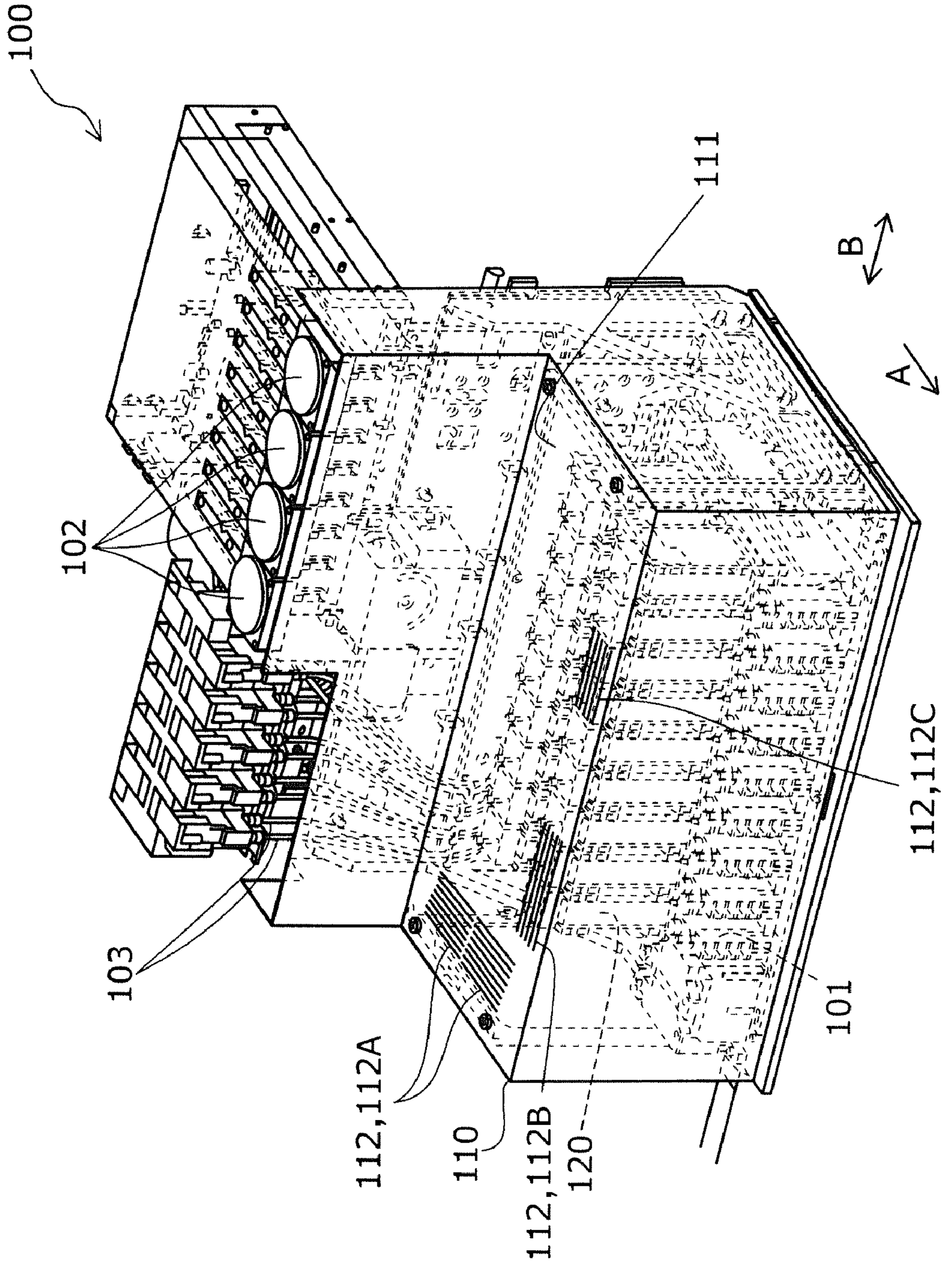
FIG. 2 is a perspective view of a carriage in the liquid ejection device of FIG. 1.
Figure 3:
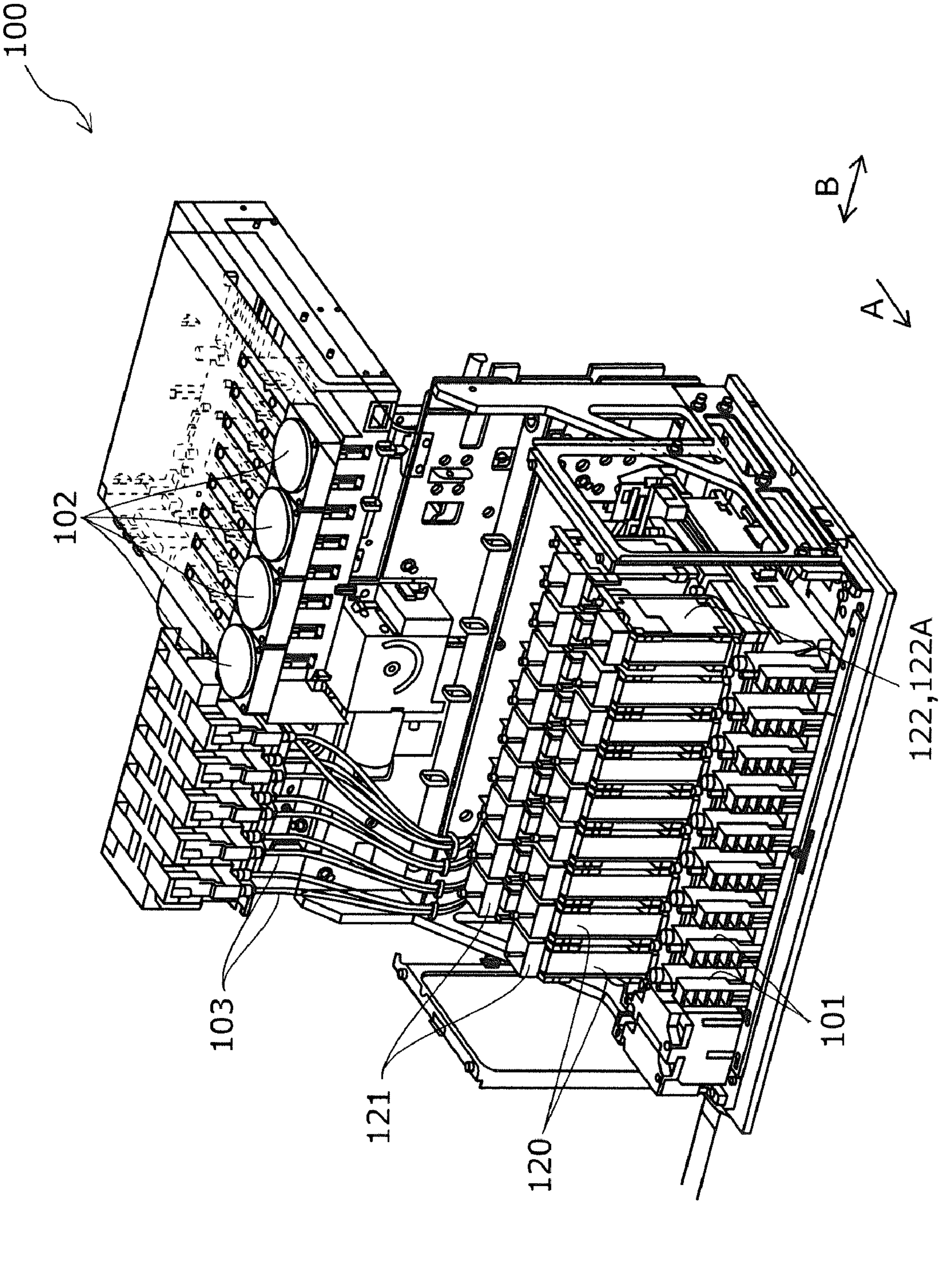
FIG. 3 is a perspective view of the carriage in the liquid ejection device of FIG. 1, showing a state in which a cover is removed.
Figure 4:
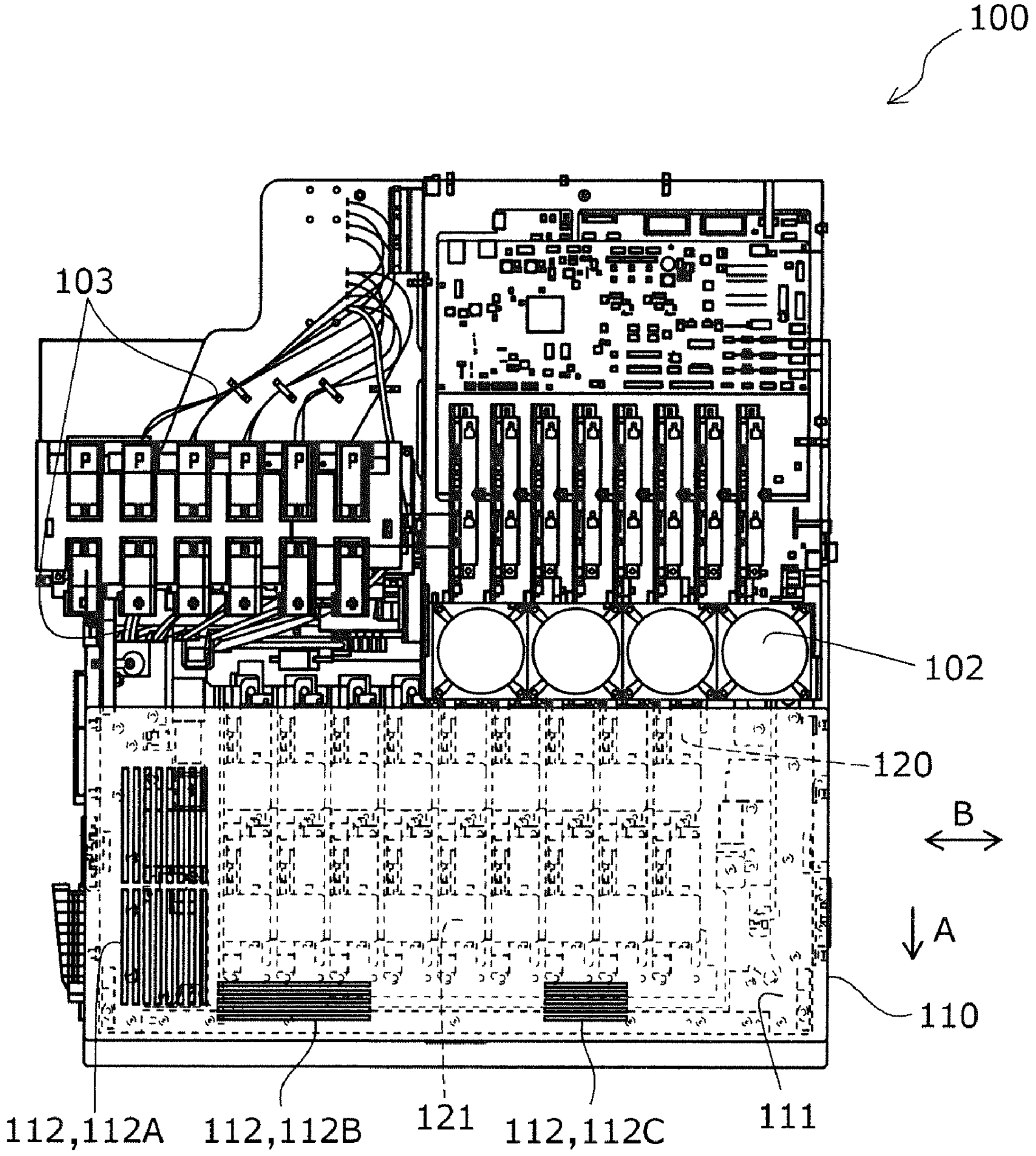
FIG. 4 is a plan view of the carriage in the liquid ejection device of FIG. 1.
Figure 5:
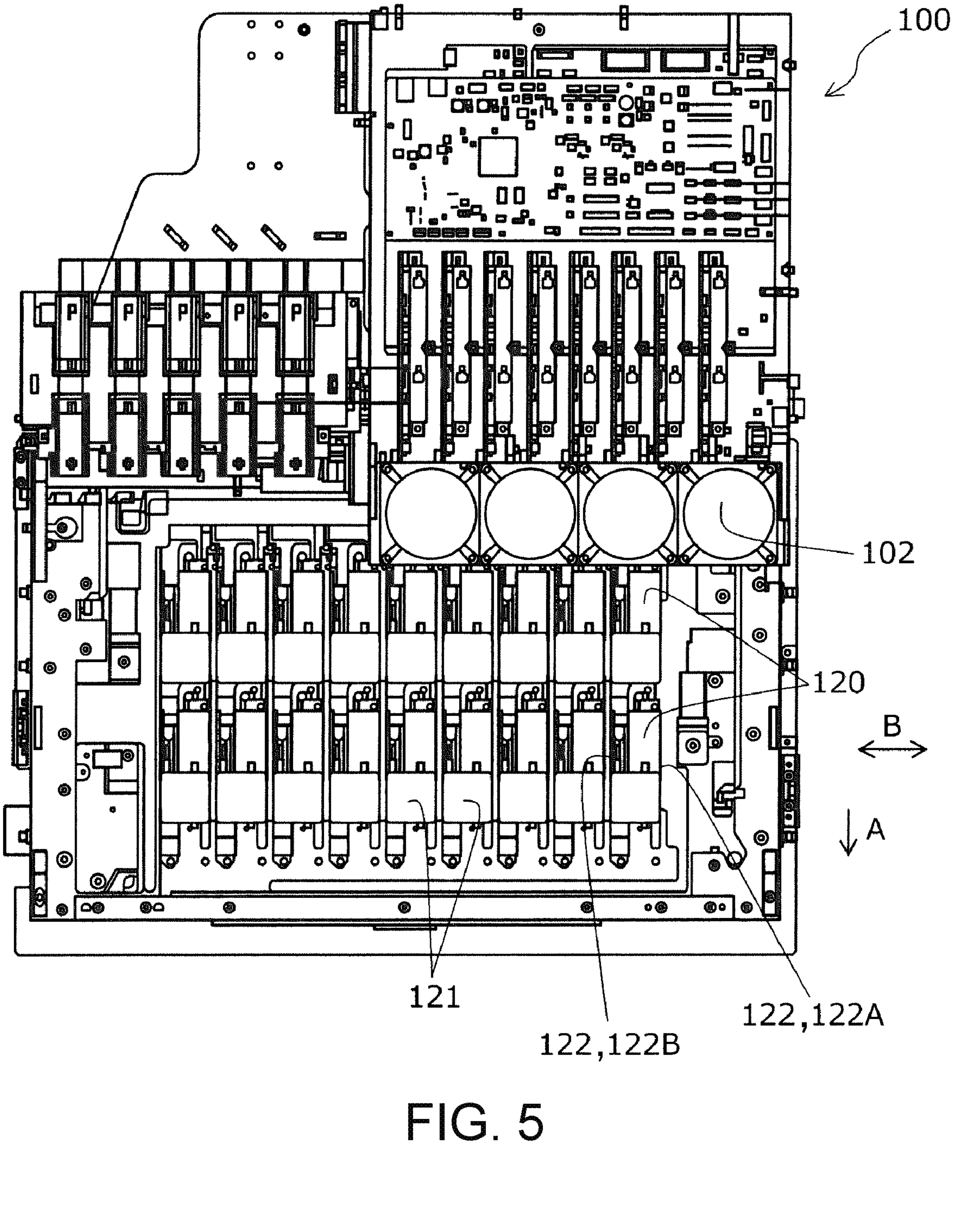
FIG. 5 is a plan view of the carriage in the liquid ejection device of FIG. 1, showing a state in which a cover is removed.
Figure 6:
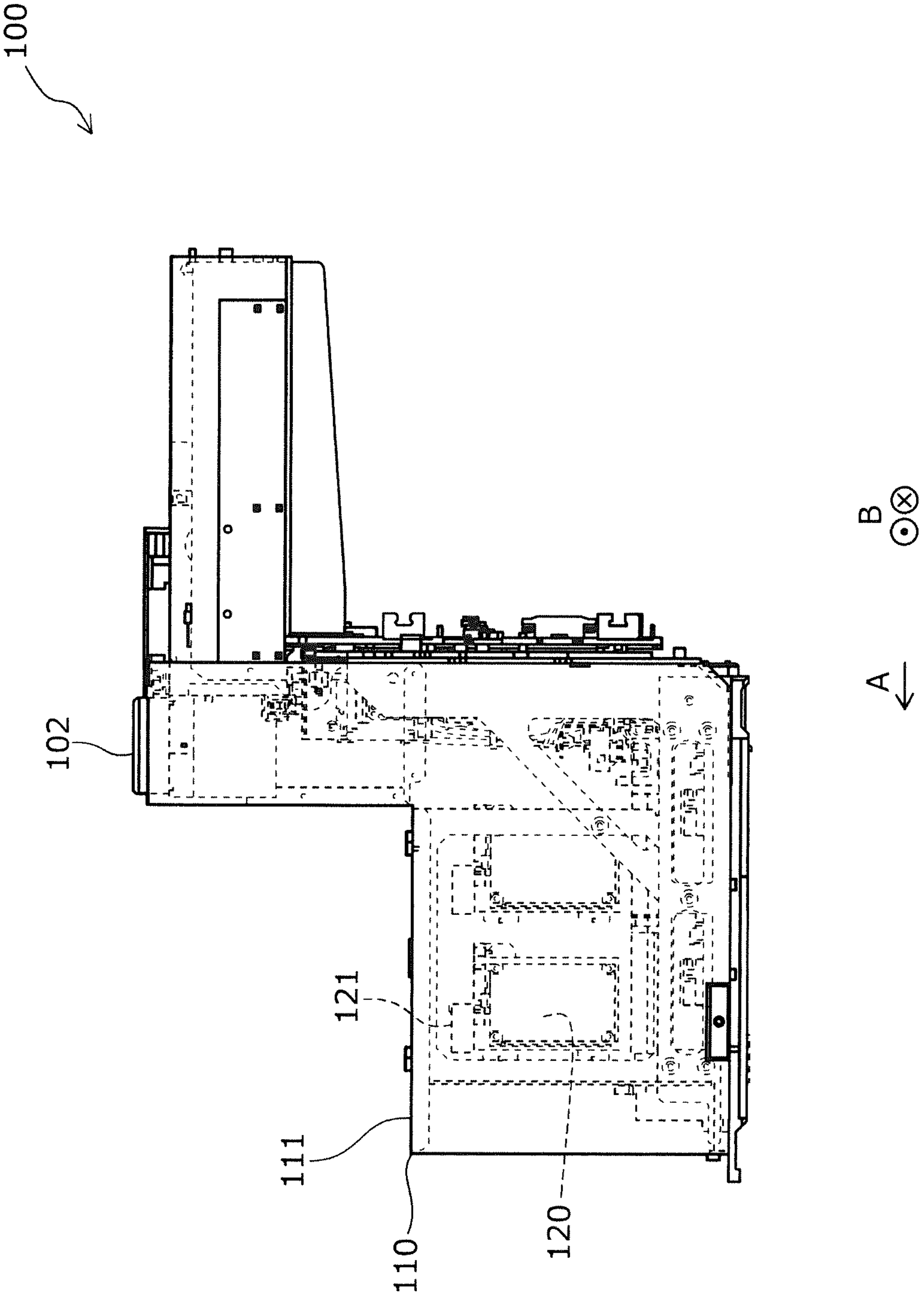
FIG. 6 is a side view of the carriage in the liquid ejection device of FIG. 1.
Figure 7:
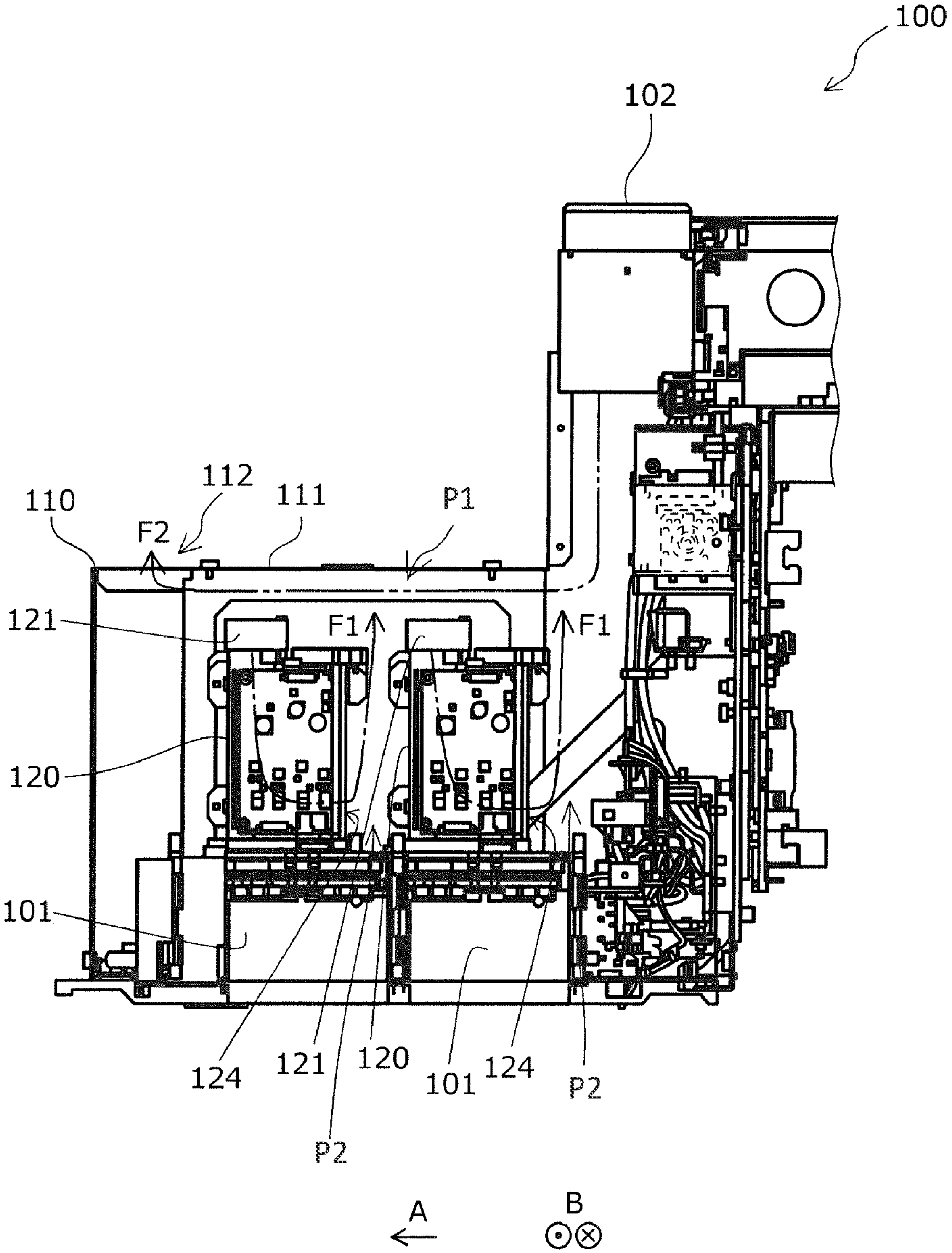
FIG. 7 is a side view of the carriage in the liquid ejection device of FIG. 1, showing a state in which a cover is removed.

Next, an internal configuration of the carriage 100, which is a main section of the liquid ejection device 1 according to the embodiment, will be described with reference to FIGS. 2 to 11. As illustrated in FIGS. 3, 5, 7, and the like, the carriage 100 of the embodiment accommodates a plurality of heads 101 for ejecting ink, which is liquid, onto the medium M, and a plurality of board cases 120. One board case 120 is attached to one head 101. Here, FIGS. 2 to 7 are all views showing the entire carriage 100, but FIG. 3 shows a state in which the cover 110 is removed from the state of FIG. 2, FIG. 5 shows a state in which the cover 110 is removed from the state of FIG. 4, and FIG. 7 shows a state in which the cover 110 is removed from the state of FIG. 6 although a part thereof is omitted.

Figure 8:
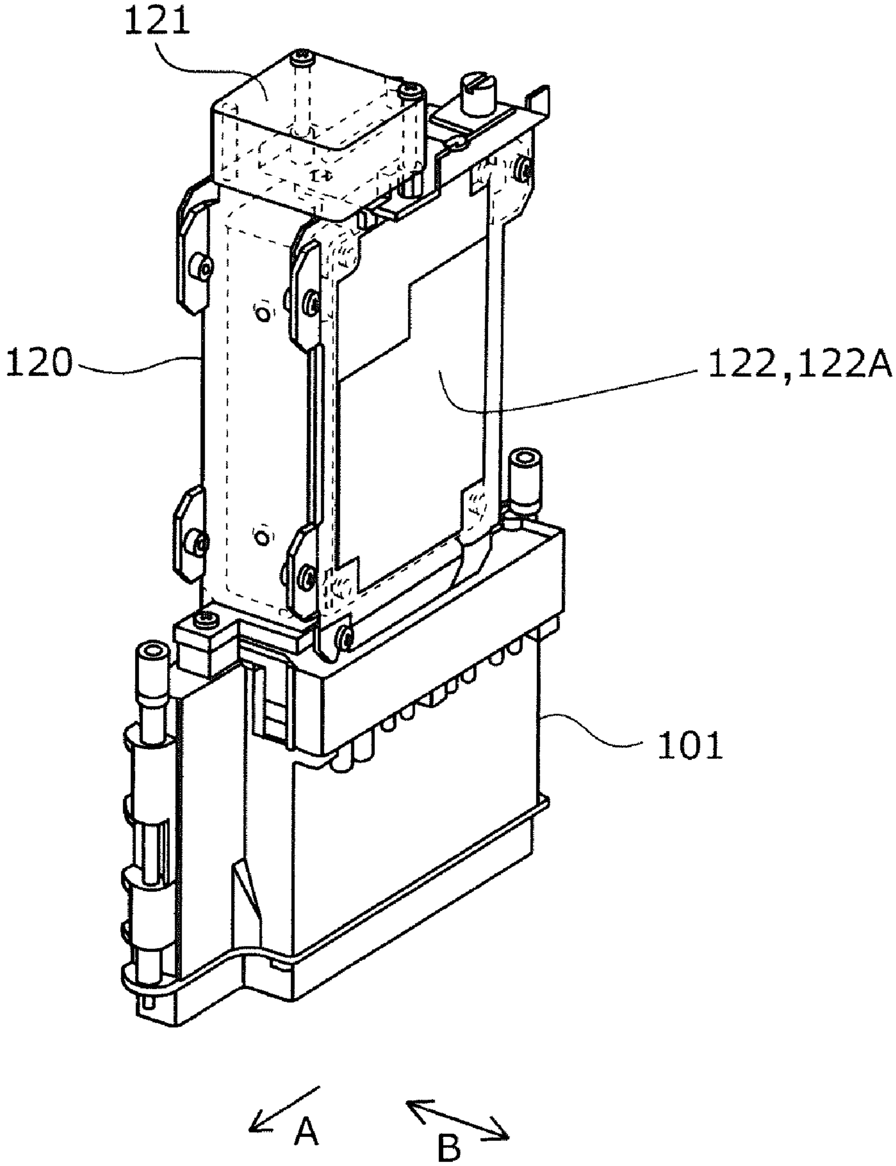
FIG. 8 is a perspective view of a head and a board case provided in the carriage of the liquid ejection device of FIG. 1, as viewed from the front side.
Figure 9:
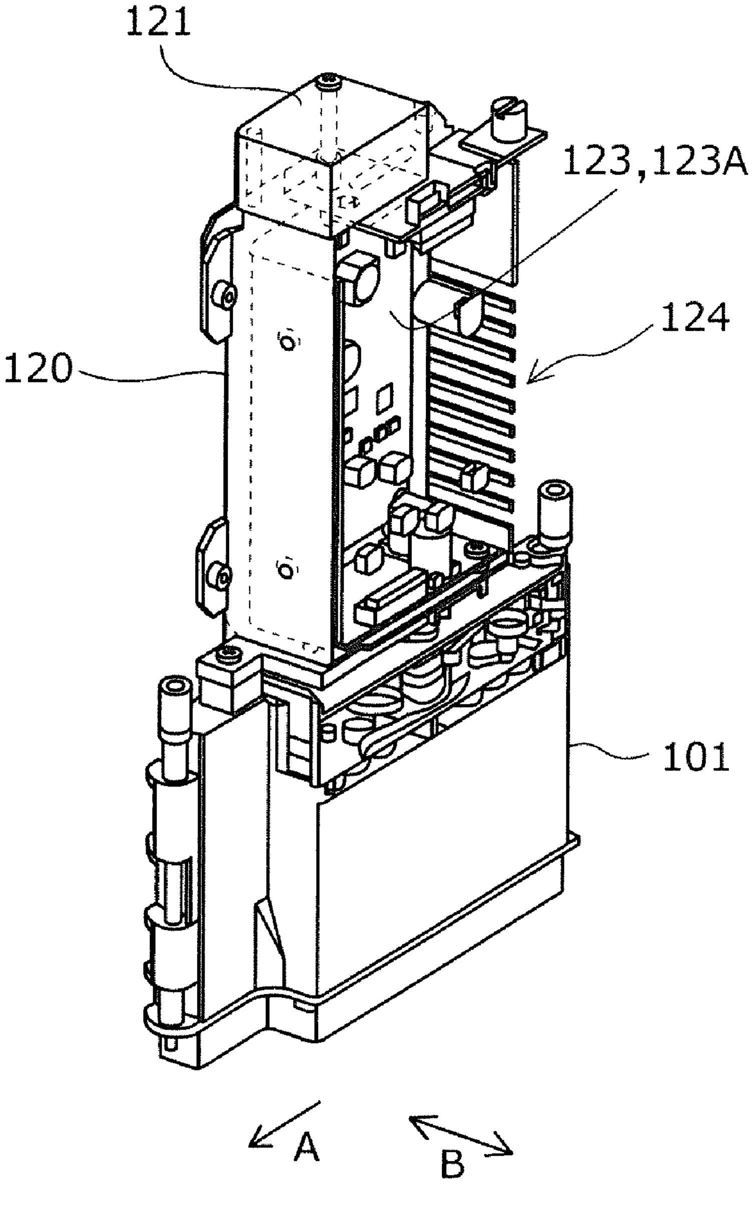
FIG. 9 is a perspective view of a head and a board case provided in the carriage of the liquid ejection device of FIG. 1, as viewed from the front side, and is a diagram illustrating a state in which a portion of the board case is removed.
Figure 10:
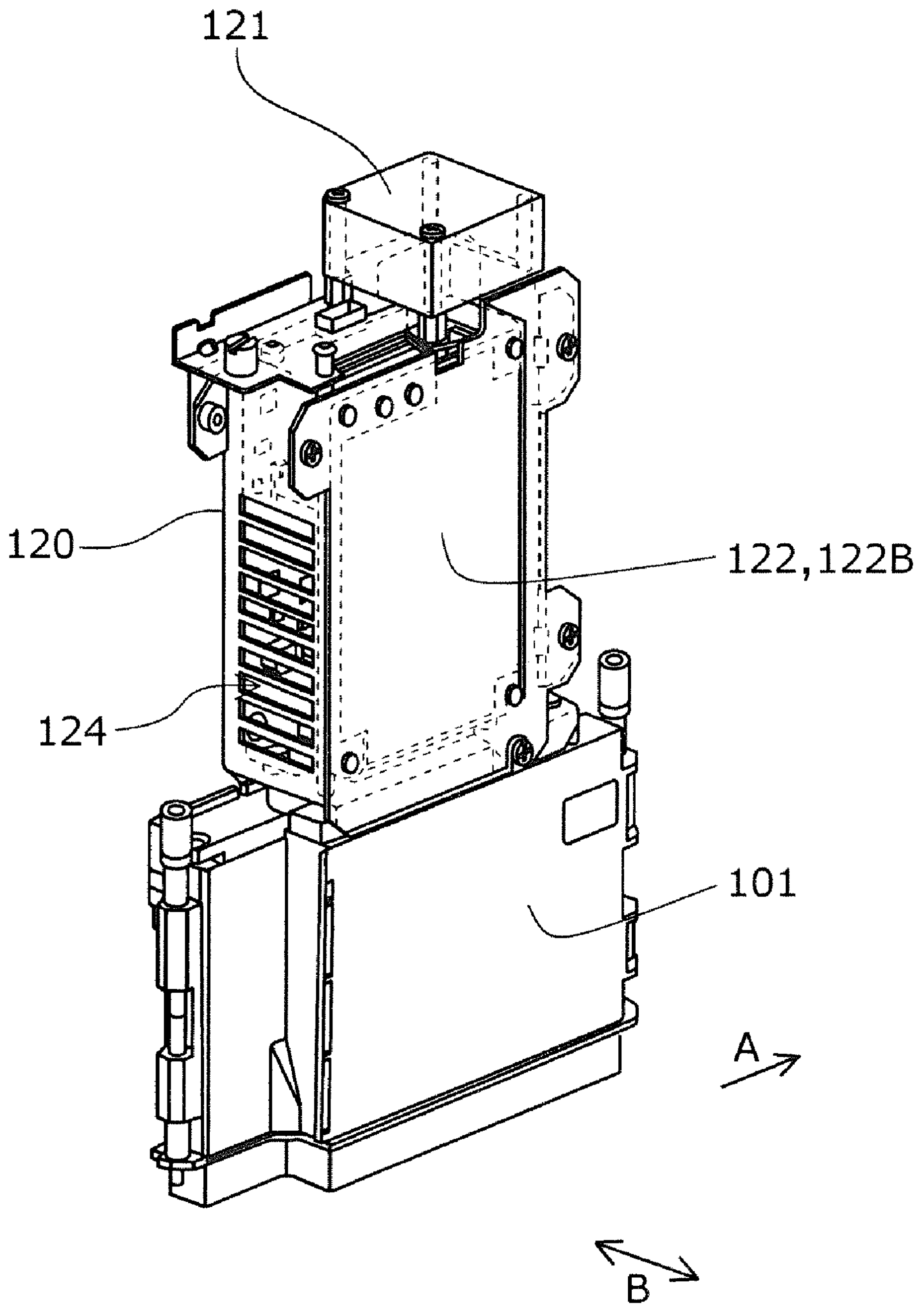
FIG. 10 is a perspective view of a head and a board case provided in the carriage of the liquid ejection device of FIG. 1, as viewed from the rear side.
Figure 11:
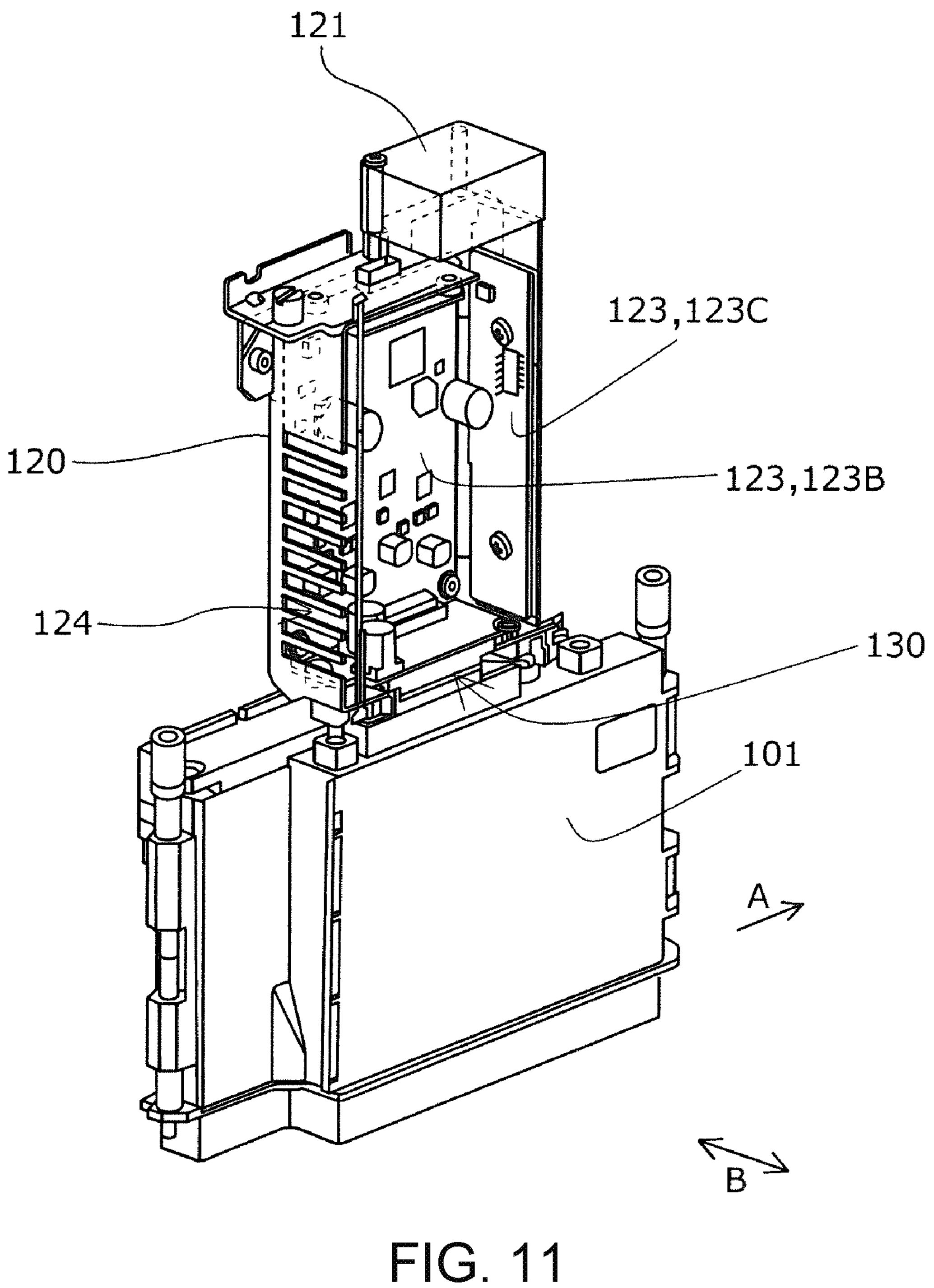
FIG. 11 is a perspective view of a head and a board case provided in the carriage of the liquid ejection device of FIG. 1, as viewed from the rear side, and is a diagram illustrating a state in which a portion of the board case is removed.

As illustrated in FIGS. 9 and 11, which are diagrams each illustrating one head 101 and one board case 120, the board case 120 accommodates a board unit 123 for driving the head 101. Here, FIGS. 8 to 11 are each views showing one head 101 and one board case 120, wherein FIG. 9 shows a state in which a first side surface section 122A of the cover 122 of the board case 120 is removed from the state of FIG. 8, and FIG. 11 shows a state in which a second side surface section 122B of the cover 122 of the board case 120 is removed from the state of FIG. 10. In the present embodiment, the board unit 123 is provided with a board 123A, a board 123B, and a board 123C at the inside of three of the four side surface sections of the cover 122. However, the number of boards constituting the board unit 123 may be one, two, four or more.

As shown in FIGS. 8 to 11 and the like, a first fan 121, which sends an air current to inside the board case 120, is fixed to the board case 120. As illustrated in FIGS. 3, 7, and the like, a second fan 102, which sends airflow taken in from outside the carriage 100 to inside the carriage 100, is provided in the carriage 100 at a position that is higher than that of the first fan 121. Note that the position of the second fan 102 with respect to the first fan 121 can also be expressed as "with the first fan 121 as the reference, on the opposite side from the head 101," instead of the expression "above" as was used previously. Here, in FIG. 7, a main flow of airflow by the first fan 121 is indicated by an arrow F1, and a main flow of airflow by the second fan 102 is indicated by an arrow F2. Note that in this embodiment, first fans 121 are provided in a one-to-one correspondence to each of the plurality of board units 123, and four second fans 102 are provided for one carriage 100. However, the present disclosure is not limited to such a configuration, and the numbers of first fans 121 and second fans 102 are not particularly limited.

In the carriage 100 of the embodiment, that is, in the liquid ejection device 1 of the embodiment, as illustrated in FIG. 11, the board unit 123 is connected to the head 101 via a board-to-board connector 130. By control of the control section 40, the amount of airflow sent into the carriage 100 by the second fan 102 is larger than the amount of airflow sent into the board case 120 by the first fan 121.

In this manner, since the board unit 123 is connected to the head 101 via the board-to-board connector 130, the quality of signals transmitted from the board unit 123 to the head 101 is improved compared to when, for example, a flexible flat cable (FFC) is used. By configuring so that the amount of airflow sent into the carriage 100 by the second fan 102 is larger than the amount of airflow sent into the board case 120 by the first fan 121, then even if the amount of airflow of the first fan 121 is small, it is possible to suppress a significant decrease in the cooling capacity of the board unit 123 by using the second fan 102 disposed at a position above the first fan 121, that is, at a position separated from the head 101.

That is, the liquid ejection device 1 of the embodiment is configured to suppress a significant decrease in the cooling capacity of the board unit 123 by using the second fan 102, even when the first fan 121, which is close to the head 101, has a small air flow amount in order to suppress vibration caused by drive of the first fan 121. Therefore, the liquid ejection device 1 according to the embodiment can cool the inside of the carriage 100 without deteriorating the quality of signals transmitted from the board unit 123 to the head 101 or the ejection accuracy of the ink from the head 101. In the liquid ejection device 1 according to the embodiment, since the second fan 102 sends airflow taken in from outside the carriage 100 to inside the carriage 100, it is possible to improve the cooling efficiency of the board case 120 by the first fan 121 by supplying the outside air to the first fan 121.

Here, as illustrated in FIG. 3 and the like, in the liquid ejection device 1 of the embodiment, the board case 120 is disposed above the head 101, and the first fan 121 is disposed above the board case 120 and is configured to be able to send airflow toward the head 101. With such a configuration, by the first fan 121 blowing air toward the head 101, the direction of the airflow is a direction from the board case 120 toward the head 101, and the inside of the board case 120 becomes a positive pressure. Accordingly, compared to when the direction of airflow is a direction from the head 101 toward the board case 120, it is difficult for the mist or the like of the ink ejected from the head 101 to enter inside the carriage 100.

As illustrated in FIGS. 2, 4, and the like, the liquid ejection device 1 of the embodiment includes the cover 110 that covers at least a part of an upper section of the carriage 100. The cover 110 is detachably attached to the carriage 100. As illustrated in FIGS. 2 and 4, the cover 110 has a top surface section 111, which is located above the head 101 while in a state of being attached to the carriage 100, and the top surface section 111 has an exhaust port 112 through which the airflow sent into the carriage 100 by the second fan 102 is discharged. In this way, it is desirable that the top surface section 111 has at least one exhaust port 112 through which the airflow sent into the carriage 100 by the second fan 102 is discharged. This is because it is possible to suppress the accumulation of heat inside the carriage 100 by discharging the airflow from the exhaust port 112. Since the exhaust port 112 is disposed in the top surface section 111, it is possible to suppress the airflow accompanying the exhaust from affecting the path of the ink ejected from the head 101. Note that in this embodiment, as shown in FIGS. 2 and 4, the exhaust ports 112 include an exhaust port 112A, an exhaust port 112B, and an exhaust port 112C, but the number and arrangement of the exhaust ports 112 are not particularly limited.

However, as shown in FIG. 4, it is desirable that least one exhaust port 112 be disposed in a region of the top surface section 111 different from a region overlapping the board case 120 in a plan view of the top surface section 111. As can be seen from a comparison between FIGS. 4 and 5, in the liquid ejection device 1 according to the embodiment, each of the exhaust ports 112 is disposed in the top surface section 111 in a region different, in plan view, from a region overlapping the board case 120. Assuming that the top surface section 111 is being viewed in plan view, if the exhaust port 112 were provided in a region overlapping the board case 120 in the top surface section 111, then the board case 120 would become an obstacle, and there would be a possibility that the air could not be suitably exhausted. However, as in the present embodiment, by disposing at least one exhaust port 112 in a region of the top surface section 111 different in plan view from a region overlapping the board case 120, it is possible to suppress a situation in which the air cannot be suitably exhausted.

As illustrated in FIGS. 2 to 5, the liquid ejection device 1 according to the embodiment includes a flow path member 103 through which flows ink that was supplied to the head 101 from outside the carriage 100. The flow path member 103 is configured to be drawn into the carriage 100 in an arrangement in which the airflow sent into the carriage 100 by the second fan 102 hits the flow path member 103. By adopting such a configuration, it is possible to cool the ink flowing through the flow path member 103, and it is possible to suppress damage to the head 101 caused by an increase in the temperature of the ink. Note that "the flow path member 103 is drawn into the carriage 100 in an arrangement in which the airflow sent into the carriage 100 by the second fan 102 hits the flow path member 103" can also be expressed as "the flow path member 103 is drawn into the carriage 100 from the side, with respect to the head 101, on which the second fan 102 is arranged."

As illustrated in FIGS. 2 to 5, more specifically, the flow path member 103 is configured to be drawn into the carriage 100 at a position between the second fan 102 and the board case 120 in an arrangement in which the airflow sent into the carriage 100 by the second fan 102 hits the flow path member 103. If the flow path member 103 were drawn into the carriage 100 from the side of the board case 120 that is opposite to the side on which the second fan 102 is disposed, then there would be a possibility that airflow having a high temperature from hitting the board case 120 would hit the flow path member 103. However, by adopting a configuration in which the flow path member 103 is disposed at a position between the second fan 102 and the board case 120, the possibility of airflow that has a high temperature due to hitting the board case 120 will hit the flow path member 103 can be suppressed and increases in the temperature of ink flowing in the flow path member 103 can be suppressed. Note that "the flow path member 103 is drawn into the carriage 100 at a position between the second fan 102 and the board case 120 so as to be hit by the airflow sent into the carriage 100 by the second fan 102" can also be expressed as "the flow path member 103 is drawn into the carriage 100 from the side, with respect to the board case 120, on which the second fan 102 is disposed."

As illustrated in FIGS. 7 and 9 to 11, in the liquid ejection device 1 according to the embodiment, the board case 120 includes a board case exhaust port 124 capable of exhausting air outside from inside the board case 120. As shown in FIG. 7, the board case exhaust port 124 faces an airflow path P2 inside the carriage 100 and the airflow path P2 is connected to an exhaust path P1, which is the path of airflow sent into the carriage 100 by the second fan 102. In this way, it is desirable that the board case exhaust port 124 faces at least one of the exhaust path P1 or the airflow path P2. With such a configuration, the heated airflow discharged from the board case 120 is easily sent outside the carriage 100 along with airflow generated by the second fan 102. Note that as in the embodiment, by a configuration in which the second fan 102 generates airflow downward from above, the influence on the turbulence of airflow inside the carriage 100 that accompanies the reciprocating movement of the carriage 100 is small compared to a configuration in which airflow by the second fan 102 is directed in the width direction B, which is the reciprocating movement direction of the carriage 100.

Note that the present disclosure is not limited to the above-described embodiments, and various modifications can be made within the scope of the disclosure described in the claims, and it goes without saying that they are also included in the scope of the present disclosure.

What is claimed is:

1. A liquid ejection device comprising:
- a head configured to eject liquid onto a medium;
- a board case in which a board unit for driving the head is accommodated;
- a first fan fixed to the board case and configured to send airflow into the board case;
- a carriage that accommodates the head and the board case; and
- a second fan that is fixed to the carriage above the first fan and that sends airflow taken in from outside the carriage into the carriage, wherein
- the board unit is connected to the head via a board-to-board connector and
- an amount of airflow sent into the carriage by the second fan is larger than an amount of airflow sent into the board case by the first fan.

2. The liquid ejection device according to claim 1, wherein
- the board case is disposed above the head and
- the first fan is disposed above the board case and sends airflow toward the head.

3. The liquid ejection device according to claim 1, further comprising:
- a cover covering at least a part of an upper section of the carriage, wherein
- the cover includes a top surface section positioned above the head and
- the top surface section includes at least one exhaust port from which airflow sent into the carriage by the second fan is discharged.

4. The liquid ejection device according to claim 3, wherein
- the at least one exhaust port is disposed in the top surface section in a region different from a region that, in plan view of the top surface section, overlaps the board case.

5. The liquid ejection device according to claim 1, further comprising:
- a flow path member through which flows liquid supplied to the head from outside the carriage, wherein the flow path member is drawn into the carriage so as to be hit by the airflow sent into the carriage by the second fan.

6. The liquid ejection device according to claim 5, wherein
- the flow path member is drawn into the carriage at a position between the second fan and the board case so as to be hit by airflow sent into the carriage by the second fan.

7. The liquid ejection device according to claim 1, wherein
- the board case includes a board case exhaust port configured to exhaust air from inside to outside the board case and
- the board case exhaust port faces at least one of an exhaust path which is a path of airflow sent into the carriage by the second fan inside the carriage or an airflow path connected to the exhaust path.

8. A carriage that accommodates a head that ejects liquid onto a medium and a board case in which a board unit for driving the head is accommodated, the carriage comprising:
- a first fan fixed to the board case and configured to send airflow into the board case;
- a carriage that accommodates the head and the board case; and
- a second fan that is fixed to the carriage above the first fan and that sends airflow taken in from outside the carriage into the carriage, wherein
- the board unit is connected to the head via a board-to-board connector and
- an amount of airflow sent into the carriage by the second fan is larger than an amount of airflow sent into the board case by the first fan.

* * * * *